Nov. 2, 1937.   R. L. BROWNLEE   2,097,559
CLUTCH PULLEY
Filed Jan. 22, 1937

Inventor:
Robert L. Brownlee
By: Stevens & Batchelor
Atty's.

Patented Nov. 2, 1937

2,097,559

UNITED STATES PATENT OFFICE 2,097,559

CLUTCH PULLEY

Robert L. Brownlee, Chicago, Ill.

Application January 22, 1937, Serial No. 121,896

5 Claims. (Cl. 74—230.24)

My invention relates to clutch pulleys, and more particularly to those receiving a belt drive, and my main object is to provide a pulley of this kind in which only a light pressure will effect a firm engagement of the clutch.

A further object of the invention is to design a clutch pulley in which a very small amount of travel will be required between the clutch elements in order to engage the same.

A still further object of the invention is to construct a clutch pulley in which only two major elements are used in connection with the belt to obtain the clutching action.

Another object of the invention is to provide a clutch pulley wherein the application of the load automatically increases the engaging action between the belt and the pulley.

An additional object of the invention is to provide a very compact clutch assembly employing a V-belt and requiring a minimum amount of longitudinal room.

An important object of the invention is to construct a clutch pulley of few and simple parts and which can be manufactured at small cost.

Figure 1:
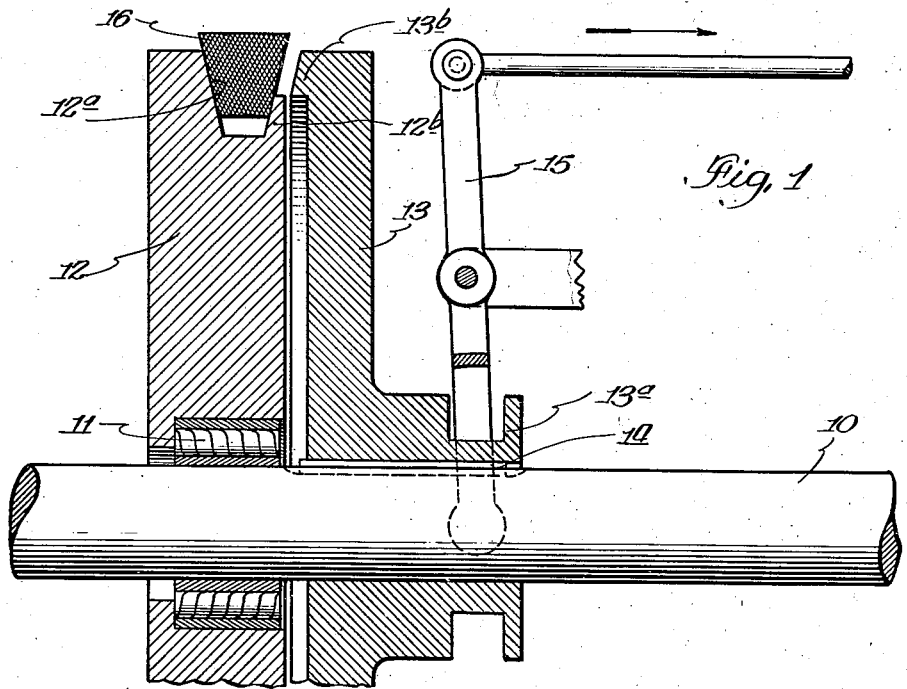
Figure 2:
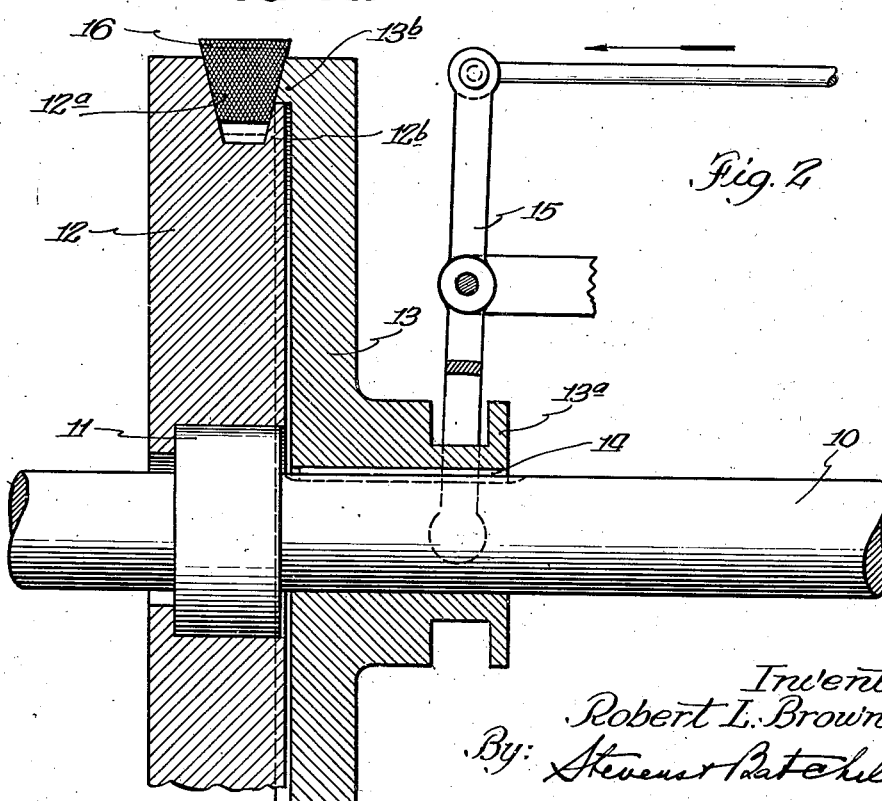

With the above objects in view, and any others which may suggest themselves from the description to follow, a better understanding of the invention may be had by reference to the accompanying drawing, in which Fig. 1 is a fragmental cross section of the novel clutch pulley in the normal or idle position, and Fig. 2 is a similar view of the pulley in the engaged or driving position.

While various clutch pulleys are found in the prior art, few appear to be designed on a basis of efficiency. In some a multiplicity of parts exists, others are bulky or extensive, and still others are doubtful of operative efficiency. I have found that a pulley of this kind to be acceptable in a modern sense must avoid the deficiencies just mentioned and prove practical from every point of view. The clutch pulley I have devised is of value for light machinery, such as for small drill presses, power sewing machines and light tools in which a clutch is desirable, and for these purposes the novel clutch pulley accomplishes the objects outlined above.

In accordance with the foregoing, specific reference to the drawing indicates the shaft of the machine or unit operated by the pulley at 10. This shaft has a bearing, preferably of the roller type indicated at 11, for the mounting of the driving or loose pulley member 12, which is in the form of a heavy circular disc. The driven member 13 of the pulley is also a disc formed with a hub 13a which is slidably keyed at 14 to the shaft, so as to be movable toward and from the member 12. A fork shifter 15 is shown for this operation, but any other suitable means may be employed which will advance the driving member to engaging position and maintain it there.

The driving member 12 is formed with a peripheral flared groove 12a suitable to receive a V-belt 16. While the outer wall of the groove is entire, the inner one is cut away to about half the depth of the groove, appearing as a flange 12b. The member 13 is extended with a short flange 13b in the direction of the belt 16, the flange occurring slightly beyond the flange 12b in a radial direction and having its inner face beveled in parallelism to the contiguous face of the belt.

With the parts shown as in Fig. 1, the clutch member 12 may be considered as receiving continuous motion from a motor, line shaft or other power source, by way of the belt 16. The member 12 thus runs as a loose pulley, and has no effect on the shaft 10. However, when the driven member 13 is urged in the direction of the member 12, the beveled face of the flange 13b comes into contact with the belt 16 with some pressure, causing the member 13 to respond to the driving impulse of the member 12 to some extent. As this occurs, the driving member 12 is gradually assuming the load carried by the shaft 10 and by this action draws on the belt. The pull on the belt causes the same to close about the pulley and sink more deeply in its groove until the load is fully assumed, as is indicated by dotted lines in Fig. 2. This travel of the belt causes it to wedge more tightly between the beveled formations of the co-acting members, resulting in a full engagement of the clutch.

It will be evident that the above action was not directly induced by the engaging pressure on the driving member 13, but occurred from the pull on the belt by the power source, around the member 12, in assuming the load referred to. It is therefore seen that only a light initial pressure is necessary to actuate the clutch; the power drive following with a far stronger effort to firmly engage the clutch members.

It is further evident that a high leverage for the clutching action is secured by having the same in a zone farthest from the center of the pulley. Also, the flange 12b serves as a retainer for the belt without the necessity of a special pulley or support for the inner side of the same. Further, the groove is of sufficient depth to permit the advance of the belt in case it suffers wear, so as to prevent slippage, the take-up being both automatic and efficient owing to the wedge shape and ample cross-sectional size of the belt.

It will also be appreciated that the present clutch has no facings to replace, the belt and clutch members sufficing to take up wear as previously mentioned. Also, owing to the very slight longitudinal travel necessary for the driving member 13, the entire pulley can be built very short and therefore takes up a minimum of space. Finally, it will be apparent that the simplicity and ruggedness of the present clutch pulley will enable it to be manufactured at low cost and to serve indefinitely without appreciable attention or repair.

I claim:—

1. A clutch comprising a driving pulley, a shaft freely mounting said pulley, a driven member laterally spaced from said pulley and slidably keyed to said shaft for movement towards and away from said pulley, a peripheral groove having diverging walls formed on said pulley, one wall of said groove being lower than the other wall, a belt carried in said groove by said walls thereof, and said driven means being formed to provide means for engaging said belt above the top of said lower wall to frictionally connect said driving and driven members when the latter is slid along said shaft into engagement with said driving member.

2. The structure of claim 1, said belt normally being supported by said walls of said groove above the floor thereof but being adapted to be wedged further into said groove upon the increase of the load thereon induced by the engagement of the belt with said means on said driven member.

3. The structure of claim 1, said belt being of substantially V-shape in cross-section to conform to the divergence of said walls.

4. The structure of claim 1, said belt being of substantially V-shape in cross-section to conform to the divergence of said walls, said means on said driven member comprising a circular flange extending laterally therefrom and having its belt engaging face beveled to conform to the angle of divergence of said lower wall.

5. The structure of claim 1, said belt being of substantially V-shape in cross-section to conform to the divergence of said walls, said means on said driven member comprising a circular flange extending laterally therefrom and having its belt engaging face beveled to conform to the angle of divergence of said lower wall, said belt normally being supported by said walls of said groove above the floor thereof but being adapted to be wedged further into said groove upon the increase of the load thereon induced by engagement of said belt with said flange on said driven member.

ROBERT L. BROWNLEE.